US008935497B1

(12) United States Patent
Yueh (10) Patent No.: US 8,935,497 B1
(45) Date of Patent: *Jan. 13, 2015

(54) DE-DUPLICATION IN A VIRTUALIZED STORAGE ENVIRONMENT

(71) Applicant: EMC Corporation, Hopkinton, MA (US)

(72) Inventor: Jedidiah Yueh, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,191

(22) Filed: Aug. 16, 2013

Related U.S. Application Data

(60) Division of application No. 13/476,666, filed on May 21, 2012, now Pat. No. 8,549,245, which is a continuation of application No. 11/864,583, filed on Sep. 28, 2007, now Pat. No. 8,209,506.

(60) Provisional application No. 60/970,187, filed on Sep. 5, 2007.

(51) Int. Cl.
*G06F 12/00* (2006.01)
*G06F 17/30* (2006.01)

(52) U.S. Cl.
CPC .................................. *G06F 17/3061* (2013.01)
USPC .......................................... 711/162; 707/644

(58) Field of Classification Search
USPC .......................................................... 711/162
See application file for complete search history.

(56) References Cited

U.S. PATENT DOCUMENTS

| 7,603,529 | B1 | 10/2009 | MacHardy et al. |
| 7,747,584 | B1 | 6/2010 | Jernigan |
| 8,280,926 | B2 | 10/2012 | Sandorfi et al. |
| 2005/0044301 | A1 | 2/2005 | Vasilevsky et al. |
| 2007/0226444 | A1 | 9/2007 | Yagawa |
| 2007/0255758 | A1 | 11/2007 | Zheng et al. |

(Continued)

FOREIGN PATENT DOCUMENTS

| KR | 10-2005-0088067 A | 9/2005 |
| KR | 10-2006-0042989 A | 5/2006 |

(Continued)

OTHER PUBLICATIONS

Netapp White Paper, "Looking Beyond the Hype: Evaluating Data Deduplication solutions", Larry Freeman, Network Appliance, Inc., Sep. 2007.

(Continued)

*Primary Examiner* — Matthew Bradley
(74) *Attorney, Agent, or Firm* — Workman Nydegger (57) ABSTRACT

In one example, a method for de-duplicating redundant data in a virtualized storage environment includes, in response to receipt of a write request that includes write data and a virtual memory address of the write data, mapping the virtual memory address to a physical memory address within a pooled storage capacity that includes a virtualization of a plurality of storage devices. Next, a determination is made that a second block of data included in the write data of the write request is identical to a first block of data that is stored in the pooled storage capacity. Finally, a pointer, rather than the second block of data, is stored in the pooled storage capacity at the physical memory address. The pointer points to the first block of data.

23 Claims, 5 Drawing Sheets

(56) References Cited

U.S. PATENT DOCUMENTS

| | | |
|---|---|---|
| 2008/0016131 A1 | 1/2008 | Sandorfi et al. |
| 2008/0098083 A1 | 4/2008 | Shergill et al. |
| 2008/0184001 A1 | 7/2008 | Stager |
| 2008/0244172 A1 | 10/2008 | Kano |
| 2008/0282047 A1 | 11/2008 | Arakawa et al. |
| 2009/0019246 A1 | 1/2009 | Murase |
| 2009/0063528 A1 | 3/2009 | Yueh |

FOREIGN PATENT DOCUMENTS

| | | |
|---|---|---|
| KR | 10-2006-0044567 A | 5/2006 |
| KR | 10-2007-0086325 A | 8/2007 |

OTHER PUBLICATIONS

Bak Young Jim, Data Writing of Deduplication System, IT Business Leader's Magazine, Seoul:KYungCom, Jul. 2007, vol. 369, pp. 134-137.

International Search Report dated Mar. 25, 2009 from International Patent Application No. PCT/US2008/075467, filed Sep. 5, 2008.

International Preliminary Report on Patentability and Written Opinion dated Mar. 9, 2010 from International Patent Application No. PCT/US2008/075467, filed Sep. 5, 2008.

Office Action dated Feb. 23, 2010 from U.S. Appl. No. 11/864,583, filed Sep. 28, 2007.

Office Action dated Aug. 13, 2010 from U.S. Appl. No. 11/864,583, filed Sep. 28, 2007.

Office Action dated May 17, 2011 from U.S. Appl. No. 11/864,583, filed Sep. 28, 2007.

Notice of Allowance dated Mar. 2, 2012 from U.S. Appl. No. 11/864,583, filed Sep. 28, 2007.

Office Action dated Nov. 13, 2012 from U.S. Appl. No. 13/476,666, filed May 21, 2012.

Office Action dated Feb. 6, 2013 from U.S. Appl. No. 13/476,666, filed May 21, 2012.

Notice of Allowance dated May 30, 2013 from U.S. Appl. No. 13/476,666, filed May 21, 2012.

Office Action dated Jul. 23, 2010 from U.S. Appl. No. 11/864,756, filed Sep. 28, 2007.

Office Action dated Jan. 5, 2011 from U.S. Appl. No. 11/864,756, filed Sep. 28, 2007.

Office Action dated Jun. 29, 2011 from U.S. Appl. No. 11/864,756, filed Sep. 28, 2007.

Office Action dated Mar. 25, 2013 from U.S. Appl. No. 11/864,756, filed Sep. 28, 2007.

Office Action dated Nov. 19, 2013 from U.S. Appl. No. 11/864,756, filed Sep. 28, 2007.

DE-DUPLICATION IN A VIRTUALIZED STORAGE ENVIRONMENT

CROSS-REFERENCE TO RELATED APPLICATIONS

The present application is a divisional of, and hereby claims priority to, U.S. patent application Ser. No. 13/476,666, entitled DE-DUPLICATION IN A VIRTUALIZED STORAGE ENVIRONMENT, and filed May 21, 2012 (the "'666 Application"); the '666 Application, in turn, is a continuation, and claims the benefit of U.S. patent application Ser. No. 11/864,583, entitled DE-DUPLICATION IN A VIRTUALIZED STORAGE ENVIRONMENT, and filed Sep. 28, 2007 (the "'583 Application"), now U.S. Pat. No. 8,209,506, issued Jun. 26, 2012; the '583 Application, in turn, claims the benefit of U.S. Provisional Application Ser. No. 60/970,187, filed Sep. 5, 2007 and entitled DE-DUPLICATION IN A VIRTUALIZED STORAGE ENVIRONMENT. All of the aforementioned applications are incorporated herein in their respective entireties by this reference.

BACKGROUND OF THE INVENTION

1. The Field of the Invention

The present invention relates to data de-duplication. More particularly, embodiments of the invention relate to software, hardware, systems, and methods for de-duplicating redundant data in pooled storage capacity of a virtualized storage environment.

2. The Relevant Technology

Virtualization is an abstraction layer that decouples physical computing resources in a computer environment from systems, applications, and/or end users that interact with those resources to deliver greater IT resource utilization and flexibility. For instance, server virtualization allows multiple virtual machines, with heterogeneous operating systems, to run in isolation, side-by-side on the same physical machine. Each virtual machine has its own set of virtual hardware (e.g., RAM, CPU, NIC, etc.) upon which an operating system ("OS") and applications are loaded. The OS sees a consistent, normalized set of hardware regardless of the actual physical hardware components.

Similarly, storage virtualization is the amalgamation of multiple storage devices into what appears to be a single storage unit. Storage virtualization presents a simple object (such as a volume) upward in a stack to, e.g., a host system, hiding the physical complexity of underlying networks, storage, and other constructs. Storage virtualization can provide many benefits, including centralizing storage management, easier replication, non-disruptive data migration when subsystems fail or are replaced, and implementation of cost-effective tiered storage, to name a few.

Notwithstanding its many advantages, storage virtualization can result in the unnecessary storage of significant amounts of redundant data in the pooled storage capacity. For instance, in a computer environment including pooled storage capacity and a plurality of host systems (e.g., servers), each with its own OS, a plurality of OSes are stored in the pooled storage capacity. In some instances, however, two or more of the OSes may be identical and/or may include identical data, files, executables, or the like. In this case, each host stores its OS and associated data, files, executables, and the like in a portion of the pooled storage allocated to it. As another example, consider an email server servicing an electronic message with a large attachment sent to a plurality of intra-system users. For every user the attachment is sent to, the email server stores a separate copy of the attachment in a portion of the pooled capacity allocated to the email server. In each of the two cases just described, redundant instances of data occupy space in the pooled storage capacity which could be used for other data. Consequently, there currently exists a need in the art for data de-duplication solutions in virtualized storage environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a data de-duplication application that de-duplicates redundant data in the pooled storage capacity of a virtualized storage environment. In a virtualized storage environment, storage capacity from a plurality of storage devices is aggregated and at least a portion of the aggregate storage capacity is presented to a host system for storage. The host system sees a consistent, normalized storage regardless of the actual underlying physical storage device or devices.

A computer environment including a plurality of storage devices for the storage of data is virtualized by providing an abstraction or virtualization layer on the plurality of storage devices to pool or aggregate some or all of the storage capacity of each storage device. The virtualization layer can be host-based, storage-based, or network-based. In one embodiment, the virtualization layer presents representations of at least two portions of the underlying storage capacity to at least two host systems. Each of the host systems can generate input/output ("I/O") requests to write data to and/or read data from their corresponding portions of the storage capacity. Each I/O request includes a virtual memory address that the virtualization layer maps to a physical memory address.

A data de-duplication application is operated in the computer environment to reduce redundant data in the aggregated storage capacity. The de-duplication application identifies redundant data in the storage capacity and replaces it with a reference/pointer to a copy of the data that is stored elsewhere in the storage capacity. For instance, the host systems may implement identical operating systems ("OSes") that include many identical files, executables, or other blocks of data. In this case, the data de-duplication application identifies the identical blocks of data, eliminates redundant copies from the storage capacity, and stores pointers at the former locations of the redundant copies pointing to a single remaining instance of the data.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any computer environment.

Figure 1:
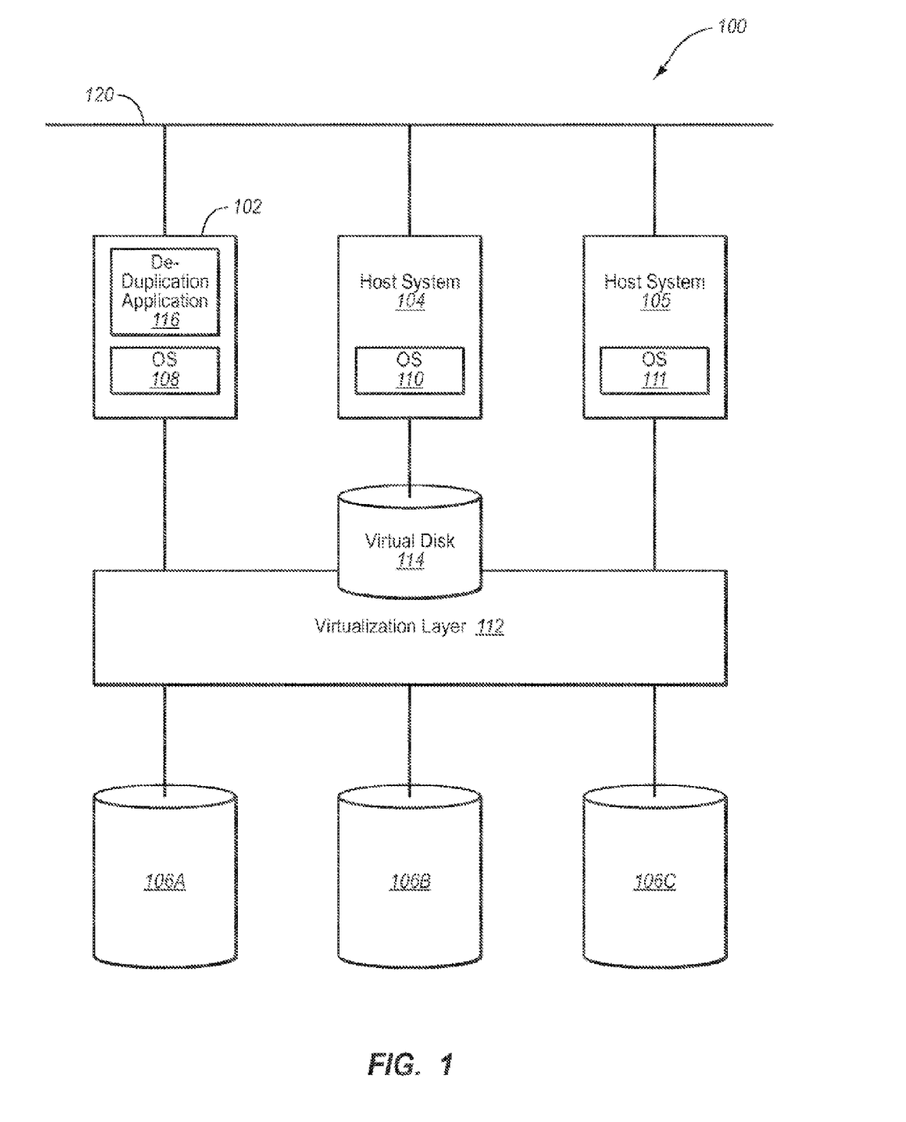
FIG. 1 illustrates a storage virtualization environment in which embodiments of the invention can be implemented.

FIG. 1 illustrates one embodiment of a computer environment 100 in which embodiments of the invention may be implemented. As shown, the computer environment 100 includes a plurality of host systems 102, 104, 105 and a plurality of storage devices 106A, 106B, and 106C (collectively referred to as "storage devices 106"). The host systems 102, 104, 105 are computer systems that run one or more server applications, such as a file server, email server, and the like, or any combination thereof. Operating systems 108, 110 and 111 are installed and run on the host systems 102, 104, 105 to manage the sharing of the resources of the host systems amongst the one or more server applications run on the host systems. In the example of FIG. 1, host systems 102, 104, 105 can exchange data over network 120, typically a local area network ("LAN"), wide area network ("WAN"), and the like or any combination thereof. Although not illustrated, network 120 can additionally provide a communication path for various client computer systems to communicate with servers 102, 104, 105.

The storage devices 106 may comprise, for instance, tape drives, disk drives, optical drives, storage arrays, and the like or any combination thereof. Additionally, the storage devices 106 can be directly attached to the host systems 102, 104, 105 in a direct attached storage ("DAS") configuration, they can be attached to the host systems 102, 104, 105 through a network in a network attached storage ("NAS") configuration, or they can be attached to the host systems 102, 104, 105 via a storage area network ("SAN").

An abstraction or virtualization layer 112 is provided in the computer environment 100 to manage access to or "virtualize" some or all of the storage capacity from each of the storage devices 106 into a uniform pool and separate the hardware of this pool from the host systems 102, 104, 105. For instance, the virtualization layer 112 presents a virtualized representation 114 of at least a portion of the storage devices 106 to the host system 104. One skilled in the art will appreciate that the virtualized representation 114 can be mapped by the virtualization layer to physical storage on all or a portion of a single storage device (such as the device 106A) or to physical storage on all or portions of multiple storage devices (such as on at least two of devices 106A, 106B and 106C).

In this example, the host system 104 sends various I/O requests to perform various operations on storage system 106. Such I/O requests typically include read and write requests. Both read requests and write requests include a virtual memory address, while write requests additionally include data to be written to the specified address. The virtualization layer 112 receives I/O requests from the host system 102 and maps virtual storage addresses to physical storage addresses. For instance, for a read request the virtualization layer sends the read request to the physical storage address and retrieves the data stored at the location, after which the data can be returned to the host system 104 as if it had come from the specified virtual storage address. For a write request, the virtualization layer sends the data to the specified physical storage address for storage.

A data de-duplication application 116 is provided in the computer environment 100 communicatively coupled to the storage devices 106 via the virtualization layer 112. The de-duplication application 116 is illustrated as operating on server or host system 102 but de-duplication agents can also be installed in storage devices (e.g., in a storage array) 106 and/or servers 102, 104. De-duplication application 116 processes data stored in storage devices 106 to identify and reduce redundant data. The de-duplication application 116 can be virtually any de-duplication application configured to identify redundant data and replace the redundant data with one or more pointers or references pointing to a single instance of the data. For instance, in one embodiment of the invention the de-duplication application 116 de-duplicates data in-line. In other words, the de-duplication application identifies and replaces redundant data with pointers as the data is ingested/written into the storage devices 106. According to another embodiment of the invention, the de-duplication application 116 de-duplicates data post-process. That is, the de-duplication application identifies and replaces redundant data with pointers after the data has already been ingested/written into the storage devices 106. Additionally, the de-duplication application 116 can de-duplicate data using a fixed block size or a variable block size. While many data de-duplication algorithms are known in the art and can be implemented by the de-duplication application 116, in one embodiment the de-duplication application implements the sticky byte algorithm disclosed in commonly assigned U.S. Pat. No. 6,810,398, which is incorporated herein by reference.

The de-duplication application can de-duplicate data in all or only a portion of the aggregate storage capacity of the storage devices 106 by configuring the virtualization layer 112 (e.g., by an administrator) to present a representation of all or only a portion of the pooled storage capacity to the de-duplication application 116. For instance, a portion of the aggregated storage can be allocated as a backup storage target. In this case, it may be desirable to prevent the de-duplication server from considering the storage allocated for backups when performing de-duplication. Alternately, it may be desirable to present a representation of all of the shared storage capacity to the de-duplication application 116 in order to globally de-duplicate data stored in the aggregate storage capacity.

Advantageously, embodiments of the invention enable more efficient utilization of storage capacity due to the de-duplication of redundant data. Further, operating in a virtualized storage environment enables one or more of the following benefits. For instance, storage capacity from multiple vendors can be combined for centralized management. Storage utilization can be increased by providing more flexible access to storage assets. Administrative costs can be decreased by enabling management of pooled storage from a single interface. Host applications (e.g., server applications running on the host systems 102, 104) are insulated from changes to the physical storage infrastructure. Data can be migrated among storage systems without interrupting applications. And finally, common network-based copy services can be applied across storage systems 106 from multiple vendors.

Figure 2:
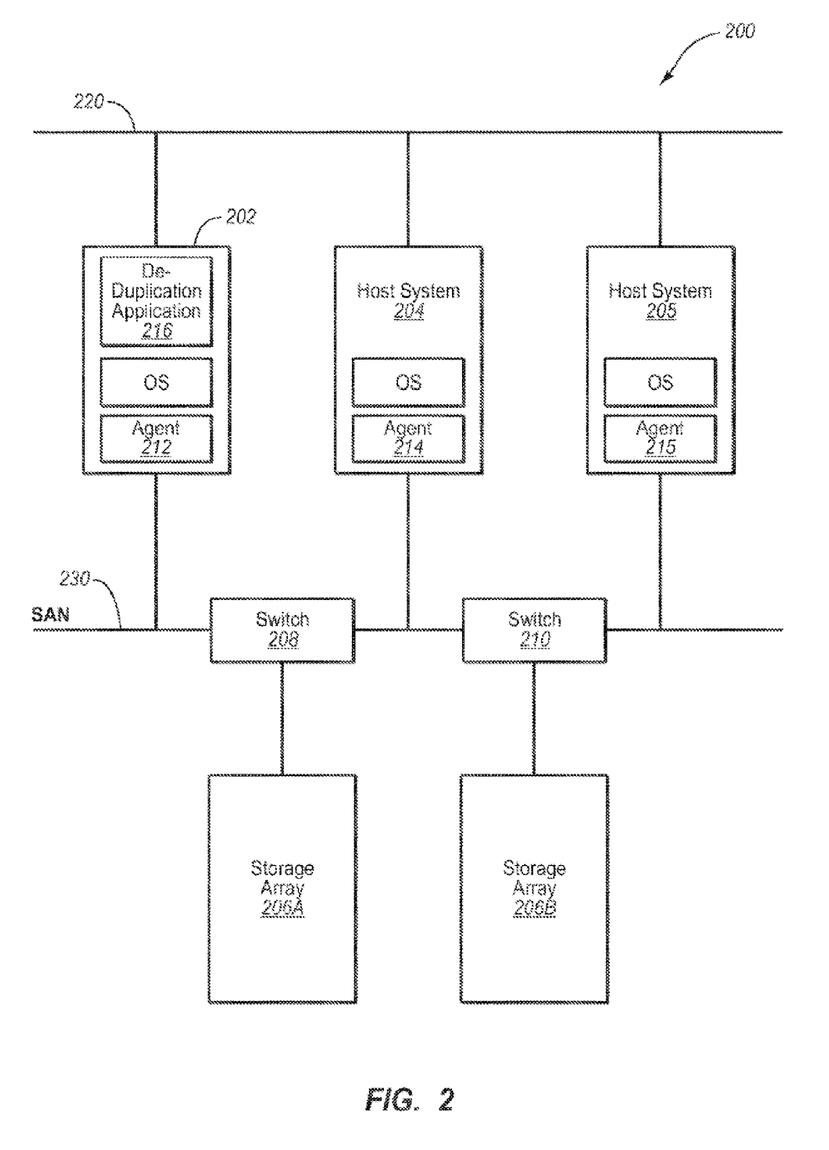
FIG. 2 illustrates a host-based storage virtualization environment according to an embodiment of the invention.
Figure 3:
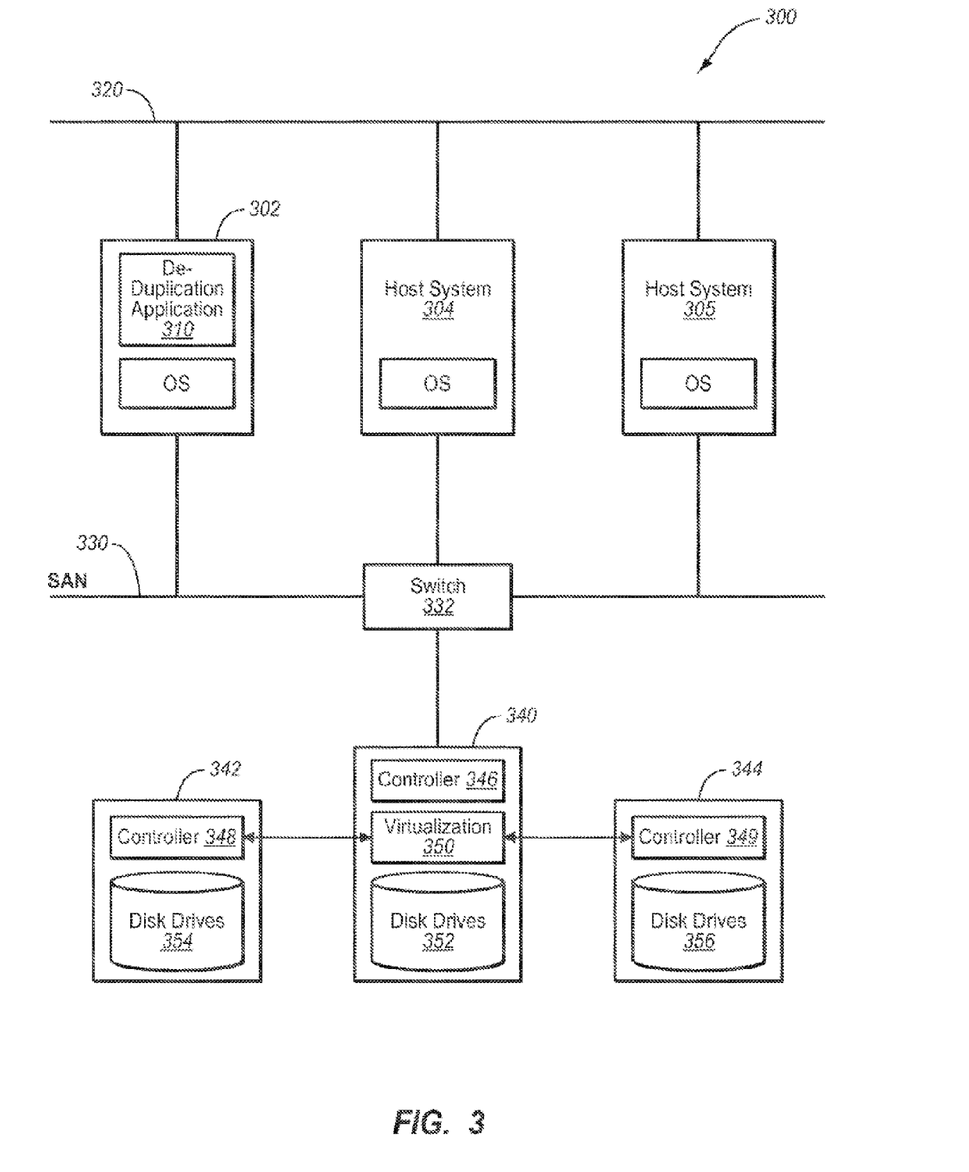
FIG. 3 illustrates a storage device-based storage virtualization environment according to another embodiment of the invention.
Figure 4:
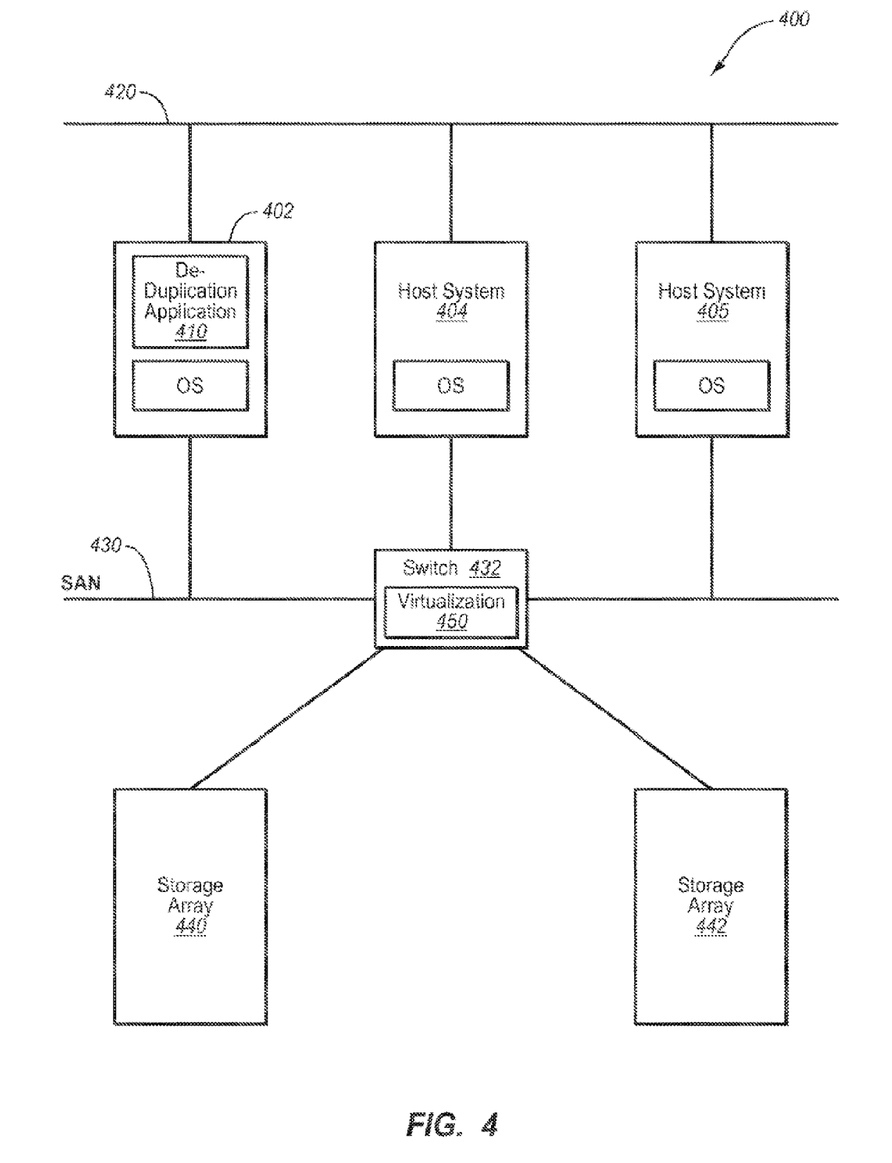
FIG. 4 illustrates a network-based storage virtualization environment according to yet another embodiment of the invention.

FIG. 1 depicts a computer environment 100 in which storage devices 106 are virtualized, without illustrating the particular methodology of virtualization. In FIGS. 2 through 4, three different virtualization implementation methodologies are illustrated: host-based, storage-based, and network-based. The principles of the invention can be implemented in conjunction with either of these three methodologies, as well as with other methodologies and variations thereof. It is understood that the embodiments of FIGS. 2-4 are illustrative only, and should not be construed to limit the invention.

For instance, FIG. 2 illustrates one embodiment of a computer environment 200 in which storage virtualization is implemented using a host-based methodology. According to this embodiment, the computer environment 200 includes a plurality of host systems 202, 204, and 205 communicatively coupled via network 220. The network 220 may also be configured to provide a communication path for various client computer systems to communicate with host systems 202 and 204.

The computer environment 200 additionally includes a SAN 230, switches 208 and 210, and storage devices 206A and 206B, implemented here as a pair of storage arrays. Each of the storage arrays 206 may include, for instance, a controller and one or more disk drives. The SAN 230 is typically a high-speed network that allows the establishment of direct connections between the storage devices 206 and the servers 202, 204. The SAN 230 can be implemented using a variety of different technologies, including fibre channel arbitrated loop, fibre channel switched fabric, IP networks (e.g., iSCSI), Infiniband, and the like.

According to this embodiment of the invention, each host system 202, 204, and 205 relies on a virtualization agent 212, 214, and 215 to provide the virtualization layer between the storage devices 206 and the host systems 202, 204, 205. The virtualization agents 212, 214, 215 monitor I/O traffic and storage 206 to perform the mappings between virtual storage addresses presented to the host systems 202, 204, 205 and physical storage addresses within the storage devices. Mapping data (also referred to herein as "virtualization metadata" or simply "metadata") can be exchanged between virtualization agents 212, 214, 215 to enable global storage management. Advantageously, the embodiment 200 enables low-cost initial deployment and incremental scaling. Further, host-based virtualization allows administrators to access advanced storage management functions such as mirroring, RAID sets, redundant pathing, and hot backups (by using mirror splits or snap-shots).

According to the present embodiment of the invention, a de-duplication application 216 is operated on the host system 202 to provide data de-duplication within the portion of the pooled storage capacity presented to the de-duplication application by the virtualization agent 212.

With reference now to FIG. 3, an embodiment of a computer environment 300 is illustrated in which storage virtualization is implemented using a storage-based methodology. The computer environment 300 includes host systems 302, 304, 305 communicatively coupled via network 320. SAN 330 and switch 332 enable the establishment of direct connections between a storage platform 340 and the servers 302, 304, 305. Storage platform 340 is additionally coupled to external storage arrays 342 and 344.

Each of the storage platform 340 and storage devices 342, 344 has a storage controller 346, 348, and 349 configured to manage an array of physical disk drives 352, 354, and 356 within the platform 340 and storage devices 342, 344, respectively. In this embodiment of the invention, a virtualization layer 350 is implemented in the storage platform 340. The virtualization layer 350 makes the disk drives 354 and 356 in external storage arrays 342, 344 appear to the host systems 302, 304 as if they were internal to storage platform 340, similar to internal disk drives 352. While the virtualization layer is illustrated in FIG. 3 within the storage array 340, storage-based virtualization can also be implemented with a virtualization layer on a standalone controller, rather than on a storage platform as shown.

In the configuration of FIG. 3, the controller 346 and virtualization layer 350 pool all the attached storage and present it as a single pool to the host systems 302, 304, 305. Advantageously, all processing of I/O requests is handled off-network and the virtualization metadata can be maintained in internal storage. Further, storage management is centralized at the storage platform 340 and there is no need to exchange metadata between two different locations, as required in FIG. 2 in order to enable global storage management. Storage virtualization according to the embodiment of FIG. 3 can allow for movement between different RAID groups without data loss, as well as automatic migration of data from one RAID group to another based upon the frequency of data access. In addition, the embodiment of FIG. 3 typically permits the creation of multiple data mirrors, which provide additional availability when one of the mirrors is split for hot backups. Storage-based virtualization can also be advantageous in providing the flexibility to modify LUN size, the ability to have multiple hosts see the same LUNs, and remote replication.

A data de-duplication application 310 is operated on the host system 302 to provide data de-duplication within the portion of the pooled storage capacity presented to the de-duplication application 310 by the storage platform 340.

With reference now to FIG. 4, an embodiment of a computer environment 400 is illustrated in which storage virtualization is implemented using a network-based methodology. The computer environment 400 includes host systems 402, 404, 405 communicatively coupled via network 420. SAN 430 and switch 432 enable the establishment of direct connections between storage arrays 440, 442 and the host systems 402, 404, 405. Although not illustrated, each of the storage arrays 440, 442 may additionally include storage controllers and arrays of physical drives, similar to the storage controllers 348, 349 and arrays of disk drives 354, 356 of FIG. 3.

In this embodiment of the invention, a virtualization layer 450 is implemented in the switch 432. Alternately or additionally, the virtualization layer can be implemented in a dedicated appliance. The switch and/or appliance monitors the SAN 430 for all available storage and builds metadata about stored data and its location. Accordingly, the switch 432 pools the attached storage 440, 442 to present a normalized set of storage hardware to the host systems 402, 404, 405.

There are two kinds of network-based virtualization products: in-band (illustrated in FIG. 4) and out-of-band (not illustrated). An in-band virtualization appliance or switch is physically located between the host systems 402, 404 and the storage 440, 442. The appliance or switch takes the disk requests from the host systems and fulfills the host request from the storage attached to the other side of the appliance or switch. This functionality is essentially transparent to the host because the switch or appliance presents itself as disk. The physical location of the appliance or switch is the primary difference between out-of-band and in-band appliances or switches. Out-of-band appliances logically present themselves as if they are located in the data path between the host and storage, but they actually reside outside of the data path. This is accomplished with the installation of a "thin" virtualization driver on the host systems in the I/O data path. The out-of-band appliance provides the virtualization driver with the storage mappings. The virtualization driver presents virtual storage volumes to the applications and file systems on the host and sends the blocks of data directly to correct physical locations on the disks. In contrast, the in-band appliance or switch requires no host-side changes. It acts as a surrogate for a virtual storage volume and performs mapping and I/O direction in a device or computer system located outside of the host.

A data de-duplication application 410 is operated on the host system 402 to provide data de-duplication within the portion of the pooled storage capacity presented to the de-duplication application 410 by the switch 432.

Advantageously, de-duplicating data in pooled storage increases the amount of available storage capacity in virtualized storage devices, which increases the amount of data that can be stored in the virtualized storage devices. Further, when data is de-duplicated in-line by a de-duplication application prior to being written to storage, less data is written to storage, thereby reducing processing overhead for a storage controller in a storage array, as well as reducing network traffic. These and other advantages may be obtained according to embodiments of the invention.

Figure 5:
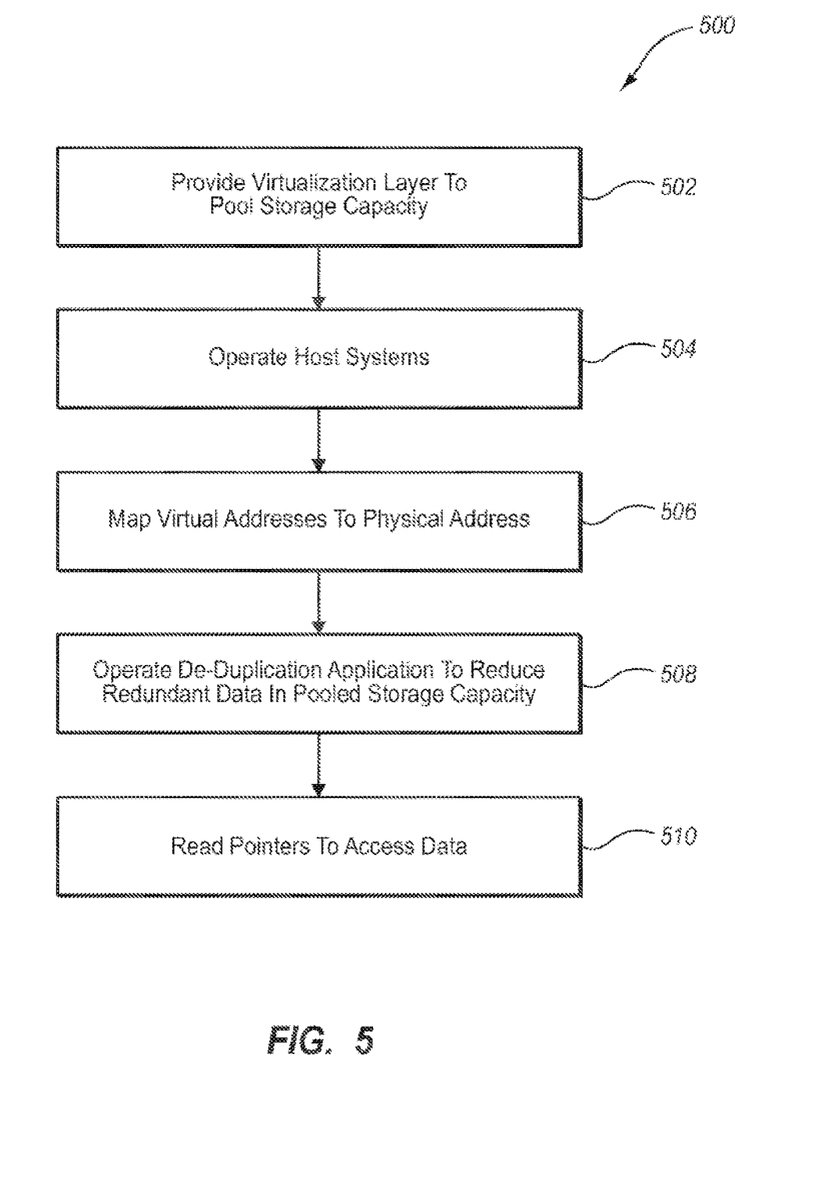
FIG. 5 illustrates a method for de-duplicating data in a virtualized storage environment.

With reference now to FIG. 5, a method 500 is illustrated for de-duplicating data in a shared storage pool, such as the shared storage of FIGS. 1-4, in the computer architectures 100, 200, 300 and 400. A typical computer architecture or environment in which the method can be implemented includes one or more host systems or server machines, and one or more storage devices, wherein the host systems send various I/O requests to perform various operations on the shared storage. The process 500 begins by providing 502 a virtualization or abstraction layer on the one or more storage devices to pool/aggregate some or all of the storage capacity of each storage device into a single storage pool. The virtualization or abstraction layer presents a representation of at least a portion of the storage pool to one or more host systems for storing data therein.

The one or more host systems are operated 504 within the computer environment and send various I/O requests to the storage pool, such as read and/or write requests. Each read and write request includes a virtual storage address, corresponding to a location in the storage pool allocated to the originating host system. The virtualization or abstraction layer intercepts 506 read and/or write requests and maps virtual storage addresses to physical storage addresses.

The method continues by operating 508 a data de-duplication application to reduce redundant data in the pooled storage capacity. The de-duplication application can be installed and operated on one of the one or more host systems. Operating the de-duplication application includes, in one embodiment, identifying redundant data, deleting it, and replacing it with a pointer that points to a single instance of the data.

Identifying redundant data may comprise breaking data into one or more pieces of a variable or fixed size, performing a hash function on each piece to obtain a hash value, and comparing the resulting hash value to hash values for data already stored in the pooled storage. If the de-duplication application implements a deterministic hash function that produces probabilistically unique hash values (e.g., SHA-1, MD5, and the like), then identical hash values indicate that the underlying data is identical. Thus, the described algorithm can be used by the de-duplication application to determine that first data is identical to second data. Upon making this identification/determination, the de-duplication application can replace the redundant data with one or more pointers pointing to a single instance of the data stored in the pooled storage. In one embodiment, the pointers implemented by the data de-duplication application may comprise corresponding hash values obtained during the step of identifying redundant data.

Returning to FIG. 5, the one or more host systems can access 510 de-duplicated data by reading pointers, which refer the one or more host systems to the single instance of the data.

The embodiments described herein may include the use of a special purpose or general-purpose computer including various computer hardware or software modules (e.g., virtualization layer, de-duplication application, and the like), as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for de-duplicating redundant data in a virtualized storage environment, the method comprising:
   in response to receipt of a write request that includes write data and a virtual memory address of the write data:
      mapping the virtual memory address to a physical memory address within a pooled storage capacity that comprises a virtualization of a plurality of storage devices;
      determining that a second block of data included in the write data of the write request is identical to a first block of data already residing in the pooled storage capacity; and
      storing a pointer in the pooled storage capacity at the physical memory address instead of storing the second block of data, the pointer pointing to the first block of data.

2. The method of claim 1, further comprising using the pointer to access and return the first block of data that is identical to the second block of data.

3. The method of claim 1, further comprising creating the pooled storage capacity by performing one of: a host-based virtualization of the plurality of storage devices; a storage-based virtualization of the plurality of storage devices; or, a network-based virtualization of the plurality of storage devices.

4. The method of claim 1, wherein determining that the second block of data is identical to the first block of data comprises:
   breaking the previously stored data into a first set of one or more blocks, the first set of one or more blocks including the first block of data;
   breaking the write data into a second set of one or more blocks, the second set of one or more blocks including the second block of data;
   performing a hash function on the first block of data to obtain a first hash value and on the second block of data to obtain a second hash value, wherein the hash function is deterministic and configured to produce probabilistically unique hash values; and
   determining that the first hash value is identical to the second hash value by comparing the first hash value to the second hash value.

5. The method of claim 4, wherein the pointer pointing to the first block of data comprises the first hash value or the second hash value.

6. The method of claim 4, wherein the size of the blocks in the first set of one or more blocks and the second set of one or more blocks is either fixed or variable.

7. A non-transitory computer medium having stored therein computer-executable instructions which, when executed by one or more processing devices, perform de-duplication of redundant data, wherein performing de-duplication of redundant data includes:
   in response to receipt of a write request that includes write data and a virtual memory address of the write data:
      mapping the virtual memory address to a physical memory address within a pooled storage capacity that comprises a virtualization of a plurality of storage devices;
      determining that a second block of data included in the write data of the write request is identical to a first block of data that is stored in the pooled storage capacity; and
      storing a pointer in the pooled storage capacity at the physical memory address instead of storing the second block of data, the pointer pointing to the first block of data.

8. The non-transitory computer medium of claim 7, wherein performing de-duplication of redundant data further comprises creating the pooled storage capacity by performing one of: a host-based virtualization of the plurality of storage devices; a storage-based virtualization of the plurality of storage devices; or, a network-based virtualization of the plurality of storage devices.

9. The non-transitory computer medium of claim 7, wherein determining that the second block of data is identical to the first block of data comprises:
   breaking the previously stored data into a first set of one or more blocks, the first set of one or more blocks including the first block of data;
   breaking the write data into a second set of one or more blocks, the second set of one or more blocks including the second block of data;
   performing a hash function on the first block of data to obtain a first hash value and on the second block of data to obtain a second hash value, wherein the hash function is deterministic and configured to produce probabilistically unique hash values; and
   determining that the first hash value is identical to the second hash value by comparing the first hash value to the second hash value.

10. A host system, comprising:
   an operating system operable to manage sharing of host system resources among applications running on the host system; and
   a physical storage device having stored therein a data de-duplication application running on the host system and including computer-executable instructions which, when executed by one or more processing devices, perform de-duplication of redundant data, wherein performing de-duplication of redundant data includes:
      in response to receipt of a write request that includes write data and a virtual memory address of the write data:
         mapping the virtual memory address to a physical memory address within a pooled storage capacity that comprises a virtualization of a plurality of storage devices;
         determining that a second block of data included in the write data of the write request is identical to a first block of data that is stored in the pooled storage capacity; and
         storing a pointer in the pooled storage capacity at the physical memory address instead of storing the second block of data, the pointer pointing to the first block of data.

11. The host system as recited in claim 10, further comprising a virtualization agent operable to create the pooled storage capacity.

12. The host system as recited in claim 10, wherein the host system comprises a server implemented in the form of a computer.

13. A method of de-duplicating data within a pooled storage capacity, the method comprising:
   comparing write data of a write request that includes the write data and a virtual storage address to original data to identify a first data block within the original data that is identical to a second data block within the write data, the original data residing in a pooled storage capacity that comprises a virtualization of a plurality of storage devices; and
   replacing one of the first data block and the second data block with a pointer that points to a remaining one of the first data block and the second data block, such that both the pointer and the data block to which it points reside in the pooled storage capacity and the data block not pointed to by the pointer does not reside in the pooled storage capacity.

14. The method as recited in claim 13, further comprising mapping the virtual storage address to a physical storage address within a portion of the pooled storage capacity allocated to the host system.

15. The method as recited in claim 13, wherein comparing the write data to the original data to identify at least a first data block within the original data that is identical to a second data block within the write data comprises:
   breaking the original data into one or more data blocks including the first data block;
   breaking the write data into one or more data blocks including the second data block;
   hashing the first data block to produce a first hash and the second data block to produce a second hash; and
   comparing the first hash and the second hash.

16. The method of claim 13, further comprising creating the pooled storage capacity by performing one of: a host-based virtualization of the plurality of storage devices;
   a storage-based virtualization of the plurality of storage devices; or,
   a network-based virtualization of the plurality of storage devices.

17. A non-transitory computer medium having stored therein computer-executable instructions which, when executed by one or more processing devices, perform de-duplication of redundant data, wherein performing de-duplication of redundant data includes:
   comparing write data of a write request that includes the write data and a virtual storage address to original data to identify a first data block within the original data that is identical to a second data block within the write data, the original data residing in a pooled storage capacity that comprises a virtualization of a plurality of storage devices; and
   replacing one of the first data block and the second data block with a pointer that points to a remaining one of the first data block and the second data block, such that both the pointer and the data block to which it points reside in the pooled storage capacity and the data block not pointed to by the pointer does not reside in the pooled storage capacity.

18. The non-transitory computer medium as recited in claim 17, wherein performing de-duplication of redundant data further comprises mapping the virtual storage address to a physical storage address within a portion of the pooled storage capacity allocated to the host system.

19. The non-transitory computer medium as recited in claim 17, wherein comparing the write data to the original data to identify at least a first data block within the original data that is identical to a second data block within the write data comprises:
   breaking the original data into one or more data blocks including the first data block;
   breaking the write data into one or more data blocks including the second data block;
   hashing the first data block to produce a first hash and the second data block to produce a second hash; and
   comparing the first hash and the second hash.

20. The non-transitory computer medium as recited in claim 17, wherein performing de-duplication of redundant data further comprises creating the pooled storage capacity by performing one of: a host-based virtualization of the plurality of storage devices; a storage-based virtualization of the plurality of storage devices; or, a network-based virtualization of the plurality of storage devices.

21. A host system, comprising:
   an operating system operable to manage sharing of host system resources among applications running on the host system; and
   a physical storage device having stored therein a data de-duplication application running on the host system and including computer-executable instructions which, when executed by one or more processing devices, perform de-duplication of redundant data, wherein performing de-duplication of redundant data includes:
      comparing write data of a write request that includes the write data and a virtual storage address to original data to identify a first data block within the original data that is identical to a second data block within the write data, the original data residing in a pooled storage capacity that comprises a virtualization of a plurality of storage devices; and
      replacing one of the first data block and the second data block with a pointer that points to a remaining one of the first data block and the second data block, such that both the pointer and the data block to which it points reside in the pooled storage capacity and the data block not pointed to by the pointer does not reside in the pooled storage capacity.

22. The host system as recited in claim 21, further comprising a virtualization agent operable to create the pooled storage capacity.

23. The host system as recited in claim 22, wherein the host system comprises a server implemented in the form of a computer.

* * * * *